Feb. 2, 1960     I. C. McKECHNIE     2,923,365
ELECTRICALLY DRIVEN WHEEL ASSEMBLY
Filed Jan. 15, 1958     2 Sheets-Sheet 1
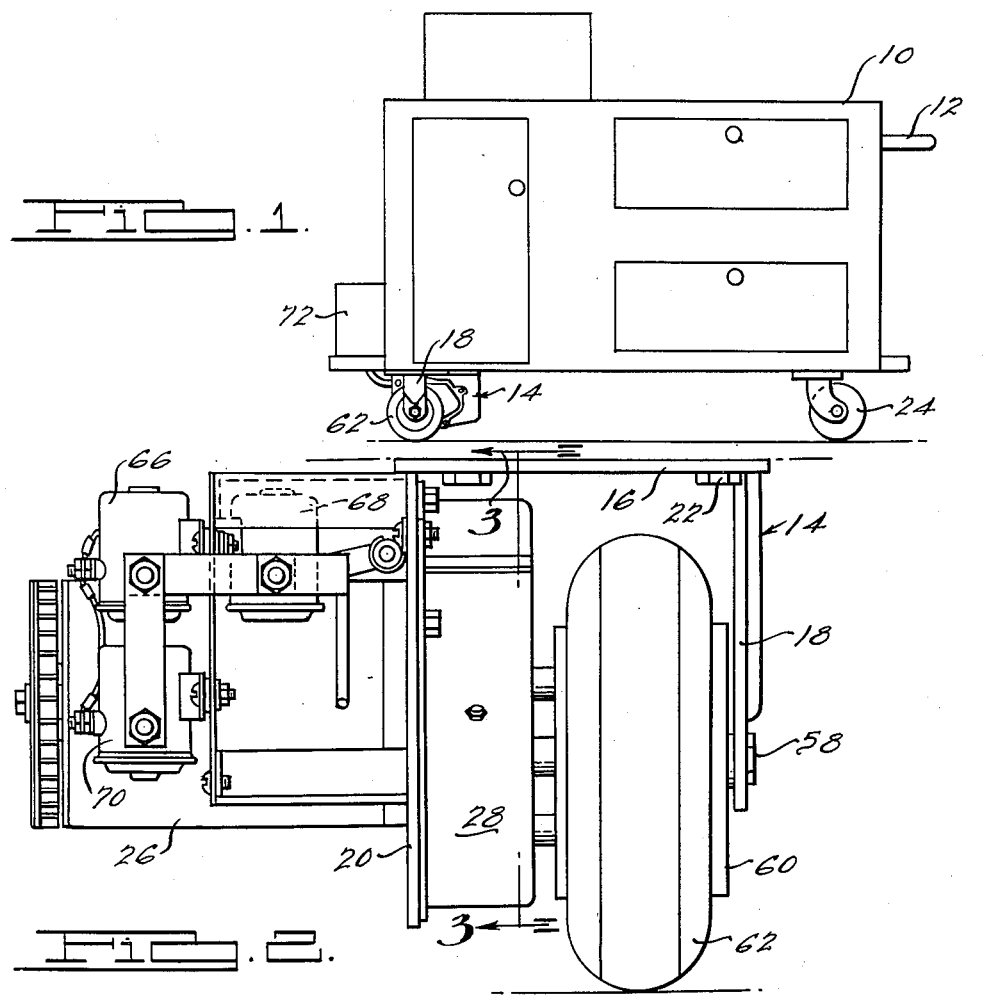
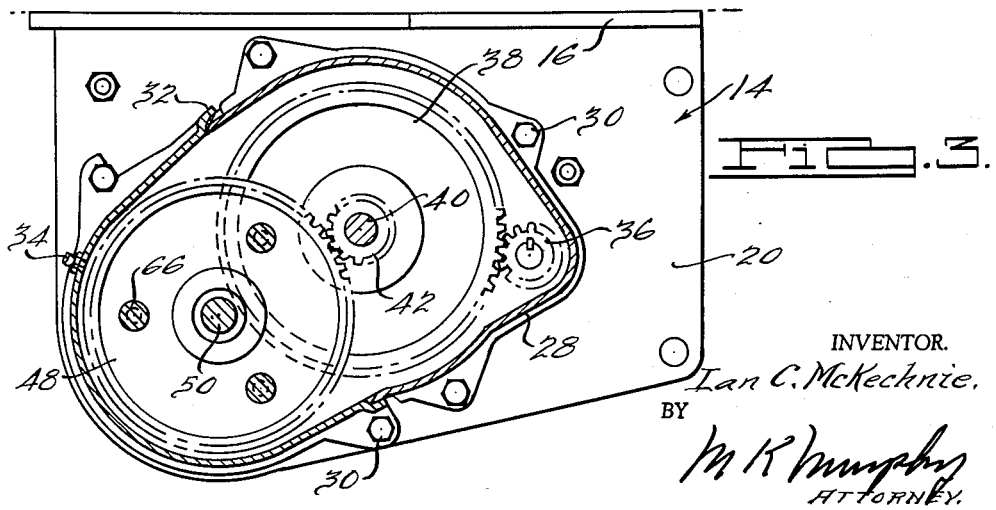
INVENTOR.
Ian C. McKechnie,
BY
M. K. Murphy
ATTORNEY.

Feb. 2, 1960       I. C. McKECHNIE       2,923,365
ELECTRICALLY DRIVEN WHEEL ASSEMBLY

Filed Jan. 15, 1958       2 Sheets-Sheet 2

INVENTOR.
Ian C. McKechnie.
BY
M K Murphy
ATTORNEY.

United States Patent Office 2,923,365
Patented Feb. 2, 1960

2,923,365
ELECTRICALLY DRIVEN WHEEL ASSEMBLY

Ian C. McKechnie, Detroit, Mich., assignor, by mesne assignments, to Morse Corporation, Cincinnati, Ohio, a corporation of Ohio Application January 15, 1958, Serial No. 709,148

1 Claim. (Cl. 180—11)

This invention relates to powered wheel assemblies and particularly to an electrically driven wheel assembly which may be manufactured as a unitary assembly for attachment to any type of wheeled device.

It is the primary object of my invention to provide a compact, simple caster assembly having a power driven wheel which is adapted to be easily and readily attached to almost any kind of wheeled vehicle such as a baggage truck, merchandise cart, food transfer cart, litter, etc. Another object is to provide a unitary motorized wheel assembly mounted on a frame in such manner that the various components, such as the wheel, the motor, the gearbox, etc., are symmetrically disposed to provide a substantially balanced assembly. Other objects and advantages will become apparent from a reading of the following specification which, taken in conjunction with the accompanying drawings, discloses a preferred form of my device.

In the drawings:

Fig. 1 is a side elevation of a cart or truck of the type used in institutions for transporting linen, food, supplies, and the like.

Fig. 2 is a detail view of the wheel assembly looking in the direction indicated by the arrow of Fig. 1.

Fig. 3 is a section taken on the line 3—3 of Fig. 2.

Figure 4:
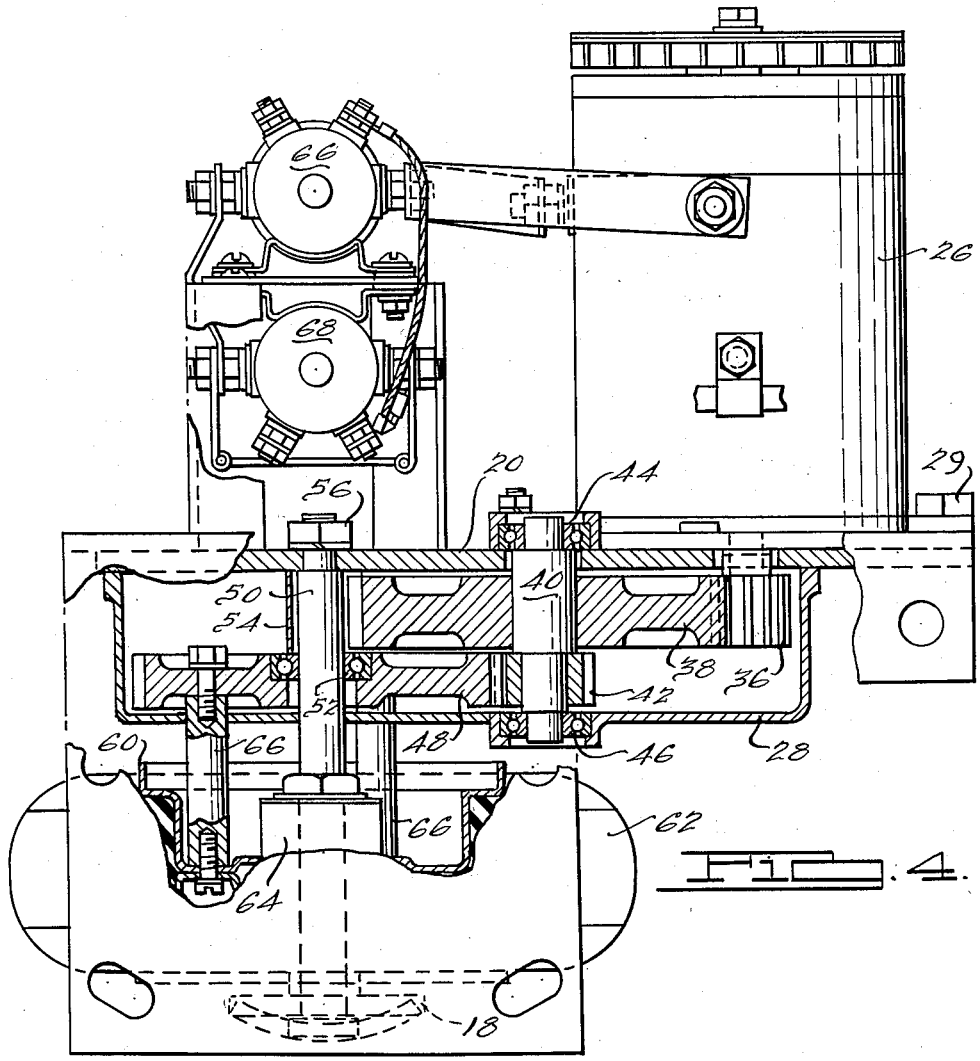
Fig. 4 is a plan view of the powered wheel assembly, parts being broken away to show sectional details.

Referring now to the drawings, it may be seen that I have shown a cart or truck 10 of the type used in hospitals and institutions for transporting food and supplies. These trucks are usually pushed around by engaging the handle 12 and have either three or four wheels, the rear wheel or wheels being, in most instances, swiveled to permit turning. These trucks are designed to carry relatively heavy loads and when loaded weigh up to eight or nine hundred pounds. In some institutions, ramps are used between floods rather than elevators and some operators, women especially, are unable to push a fully loaded truck.

I have provided a powered caster or wheel assembly of simple design which may be attached to the truck in place of one or more of the conventional wheels. The truck may be then easily maneuvered by a person with very little effort and heavy loads can be transported up ramps and for considerable distances.

In the particular form shown, the powered assembly is carried by a frame 14 having a horizontal portion 16 and depending vertical portions 18 and 20. The assembly is adapted to be rigidly attached to the main frame of the truck 10 by bolts 22, but if desirable could be swiveled on a vertical axis in the manner of a conventional caster mounting, such as the caster 24.

An electric motor 26 is mounted on the vertical frame member 20 by means of bolts 29, the motor being provided with the usual mounting flange. On the opposite side of the frame member 20, a gear case 28 is detachably mounted by means of bolts 30. The case is made in two parts and is separable along the overlapping joint 32 (Fig. 3). A grease fitting 34 permits adding lubricant to the gear case after assembly.

The motor 26 has a pinion 36 mounted on the drive shaft thereof, which pinion is disposed in mesh with a large diameter gear 38. The latter is mounted on a live stub axle 40 which also carries a pinion 42. The pinion 42 is mounted on a reduced portion of the axle and both it and the gear 38 are fixed on the axle by means of a key, press fit or equivalent. The axle 40 is rotatably mounted in the coaxial bearings 44 and 46 which are suitably mounted in the frame portion 20 and the wall of the case 28 as shown.

The pinion 42 meshes with a second large diameter gear 48 which is journaled on a dead axle 50. A bearing 52 mounts the gear and a spacer 54 is provided to prevent axial displacement, the spacer being suitably cut out to allow for the gear 38.

The axle 50 has a reduced threaded portion at its inner end which is secured to the frame portion 20 by a nut 56. The outer end is similarly reduced and threaded and is secured by a nut 58 to the depending frame portion 18.

A wheel 60 having a tire 62 is journaled on the axle 50 through suitable bearing means carried in the hub 64, and this wheel is drivingly connected to the gear 48 by a plurality of driving pins 66. The latter are secured to the webs of the gear 48 and wheel 60 respectively by suitable fasteners such as cap screws as shown in Fig. 4.

The motor 26 may be of any commercially available type operable by a conventional six or twelve volt storage battery, such as, for example, an automobile starting motor. The ratio of the gears and pinions is chosen such that the motor, when running under constant load and regulated by a resistor as will be later described, will provide a comfortable walking speed of about two and one-half miles per hour.

Figure 5:
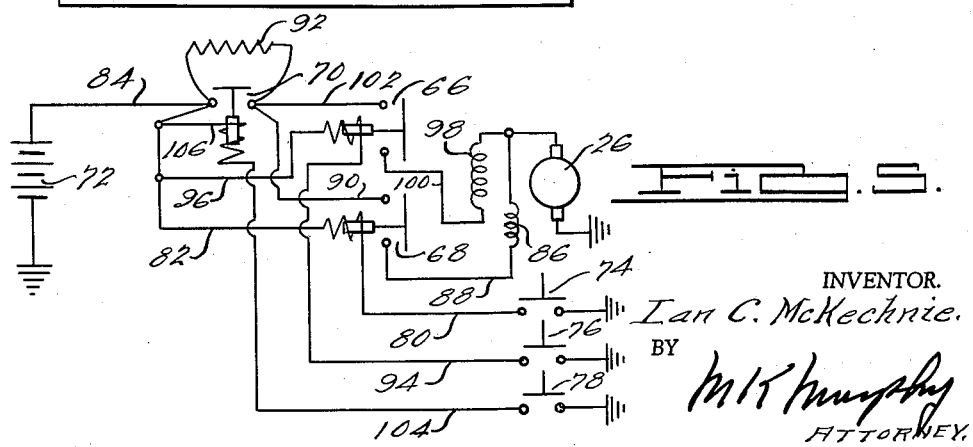
Fig. 5 is a schematic wiring diagram of the device.

Carried on the frame member 20 opposite the wheel 60 is a control assembly which comprises the solenoid operated switches 66, 68, 70, together with the required resistor and connecting bus-bars and leads, all of which are shown schematically on the wiring diagram of Fig. 5.

A storage battery 72 of required capacity is mounted on the body of the wagon 10. The motor 26 is of the split field type with the field sections wound oppositely to provide reverse rotation. Suitable push buttons (not shown) indicated in Fig. 5 at 74, 76, 78, are provided in proximity to handle 12.

It will be seen that operation of push button switch 74 will connect the coil of switch 68 to battery 72 through leads 80, 82 and 84. This causes switch 68 to be closed by action of the solenoid thus connecting field section 86 to the battery through the leads 88 and 90, resistor 92 and lead 84 for forward rotation of the motor 26, the armature of which is grounded and connected in series with each field section.

Similarly, operation of push button switch 76 energizes the coil of switch 66 through leads 94, 96 and 84 which, in turn, connects field section 98 to battery 72 through leads 100, 102, resistor 92 and lead 84 for reverse movement.

Resistor 92 reduces the voltage on motor 26 sufficiently to provide a comfortable walking speed of travel of the wagon with the gear ratios selected. With a heavily loaded wagon and/or when negotiating ramps, etc., more torque may be required. The push button 78 is then depressed, along with button 74 or button 76. Operation of button 78 energizes the coil of switch 70 through leads 104, 106 and 84, and thus short-circuits the resistor 92 and applies full battery voltage across the motor for travel in either direction.

The wiring harness from the control assembly to the handle 12 for the switches 74, 76, 78, has not been shown as it is preferably fastened along the bottom and rear end portions of the wagon.

It will thus be seen that I have provided a motorized wheel assembly which can be easily and readily mounted on almost any type of cart or wagon designed for manual pushing or pulling, which assembly is attachable or detachable, as desired, and is of simple and economical design.

Various changes in the details of the assembly may be made to facilitate manufacture or to adapt the device to different carts, wagons, etc., without departing from the spirit or scope of my invention as set forth in the appended claim.

I claim:

A unitary power driven wheel assembly and control mechanism therefor adapted for attachment to pushcarts and the like comprising, a main frame having a horizontal portion and a vertical portion extending downwardly from said horizontal portion, means on said horizontal portion for securing the assembly to a pushcart or like vehicle, a gearbox mounted on one side of said vertical frame portion, a wheel-carrying axle mounted on the same side of said vertical frame portion as said gearbox, an electric motor mounted on the opposite side of said vertical frame portion but displaced longitudinally from said axle, gearing in said gearbox drivingly interconnecting said motor and said axle, and a control unit for controlling direction of motor rotation secured to said opposite side of said vertical frame member substantially in axial alignment with said axle whereby the assembly is substantially balanced about the vertical axis thereof.

References Cited in the file of this patent

UNITED STATES PATENTS

| | | |
|---|---|---|
| 2,027,218 | Armington | Jan. 7, 1936 |
| 2,039,513 | Baker | May 5, 1936 |
| 2,513,718 | Gfrorer | July 4, 1950 |
| 2,586,273 | Steven | Feb. 19, 1952 |
| 2,706,008 | Voigt | Apr. 12, 1955 |
| 2,820,524 | Bear | Jan. 21, 1958 |